United States Patent [19]
Beaudet et al.

[11] Patent Number: 5,567,049
[45] Date of Patent: Oct. 22, 1996

[54] DOMESTIC MIXER WITH SAFETY DEVICE

[75] Inventors: Jean-Yves Beaudet, Haleine; Marc Marriere, Ambrieres Les Vallees; Jean-Pierre Trocherie, St Pierre des Nids, all of France

[73] Assignee: Moulinex S.A., Paris, France

[21] Appl. No.: 523,253

[22] Filed: Sep. 5, 1995

[30] Foreign Application Priority Data

Sep. 2, 1994 [FR] France ................................. 94 10586

[51] Int. Cl.$^6$ ............................. B01F 13/04; B02C 23/04
[52] U.S. Cl. ............................. 366/206; 241/36; 241/37.5
[58] Field of Search ................................. 366/205, 206, 366/314; 99/348; 241/36, 37.5

[56] References Cited

U.S. PATENT DOCUMENTS

| | | | |
|---|---|---|---|
| 3,612,126 | 10/1971 | Emmons et al. | 366/205 X |
| 3,892,365 | 7/1975 | Verdun | 366/206 X |
| 4,213,569 | 7/1980 | Amiot | 241/37.5 |
| 4,335,860 | 6/1982 | Grandel et al. | 241/37.5 |
| 4,396,159 | 8/1983 | Podell | 241/37.5 |
| 4,487,509 | 12/1984 | Boyce | 366/206 X |
| 4,506,836 | 3/1985 | Williams | 241/37.5 |
| 4,629,131 | 12/1986 | Podell | 241/37.5 X |
| 4,691,870 | 9/1987 | Fukunage et al. | 241/37.5 X |
| 4,741,482 | 5/1988 | Coggiola et al. | 241/37.5 |
| 5,323,973 | 6/1994 | Ferrara, Jr. | 241/37.5 |

FOREIGN PATENT DOCUMENTS 344061  11/1989  European Pat. Off. .............. 241/37.5

*Primary Examiner*—Charles E. Cooley
*Attorney, Agent, or Firm*—Young & Thompson

[57] ABSTRACT

A domestic mixer comprises a base (11) enclosing an electric motor (13) whose output shaft (15) projects from the base, as well as a bowl (18) adapted to be closed by a cover (20), mounted removably on the base (11) and having a rotatable tool (24) adapted to be coupled with the shaft (15) of the motor. The cover (20) and the upper edge (40) of the bowl (18) are interconnected by at least one bolt (44) secured to the cover (20) and connected, by a transmission member (46) actuable by the bolt, to a control member (48) movably mounted through the upper portion (16) of the base (11) between a working position to which it is brought when the cover (20) is locked by the bolt (44) and in which, under the action of the transmission member (46), it actuates a switch (50) adapted to permit the starting of the motor (13), and a rest position to which it is brought when the cover (20) is open and in which it does not actuate the switch (50), thereby to stop the motor (13).

6 Claims, 2 Drawing Sheets

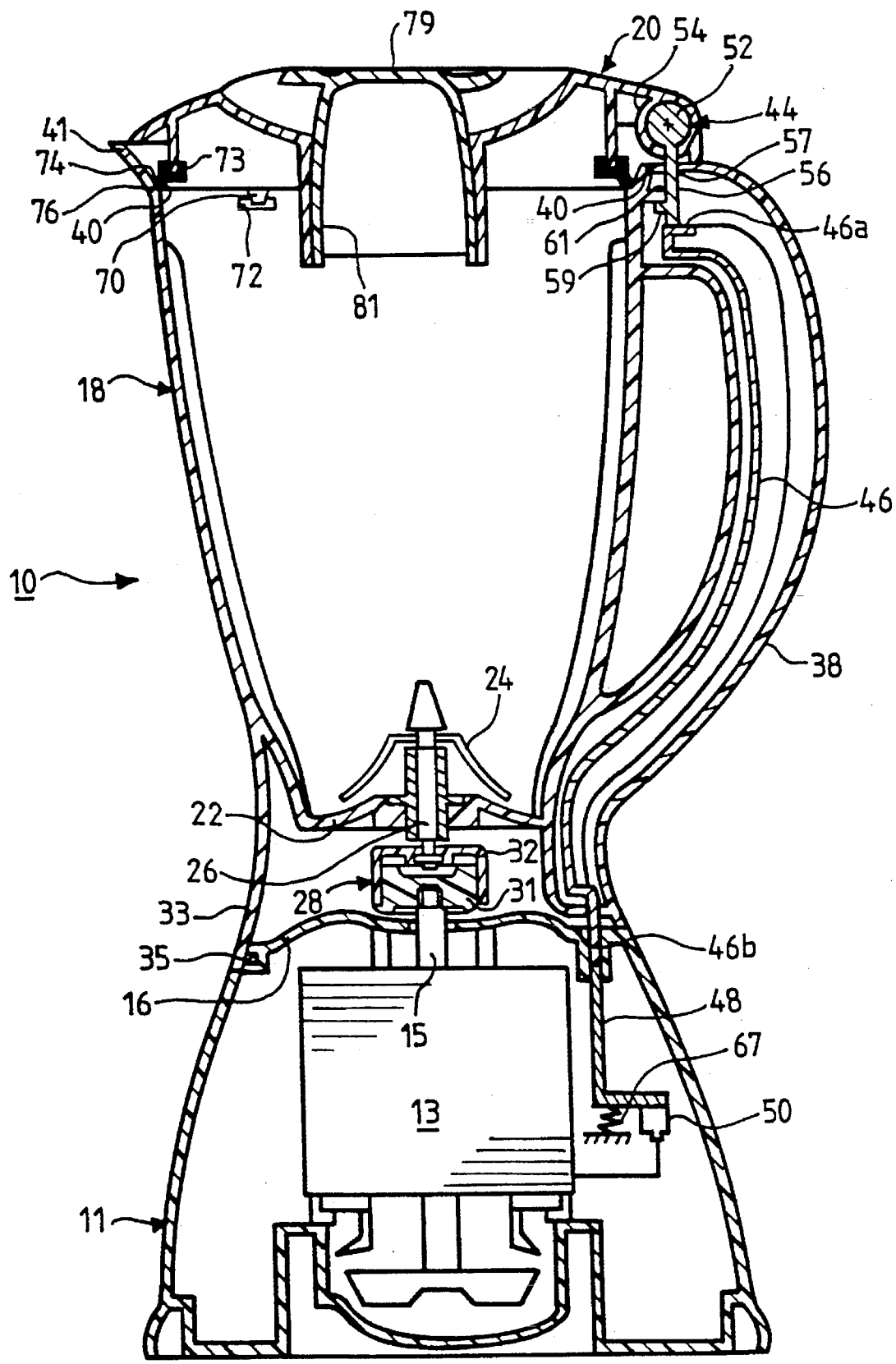
FIG_1

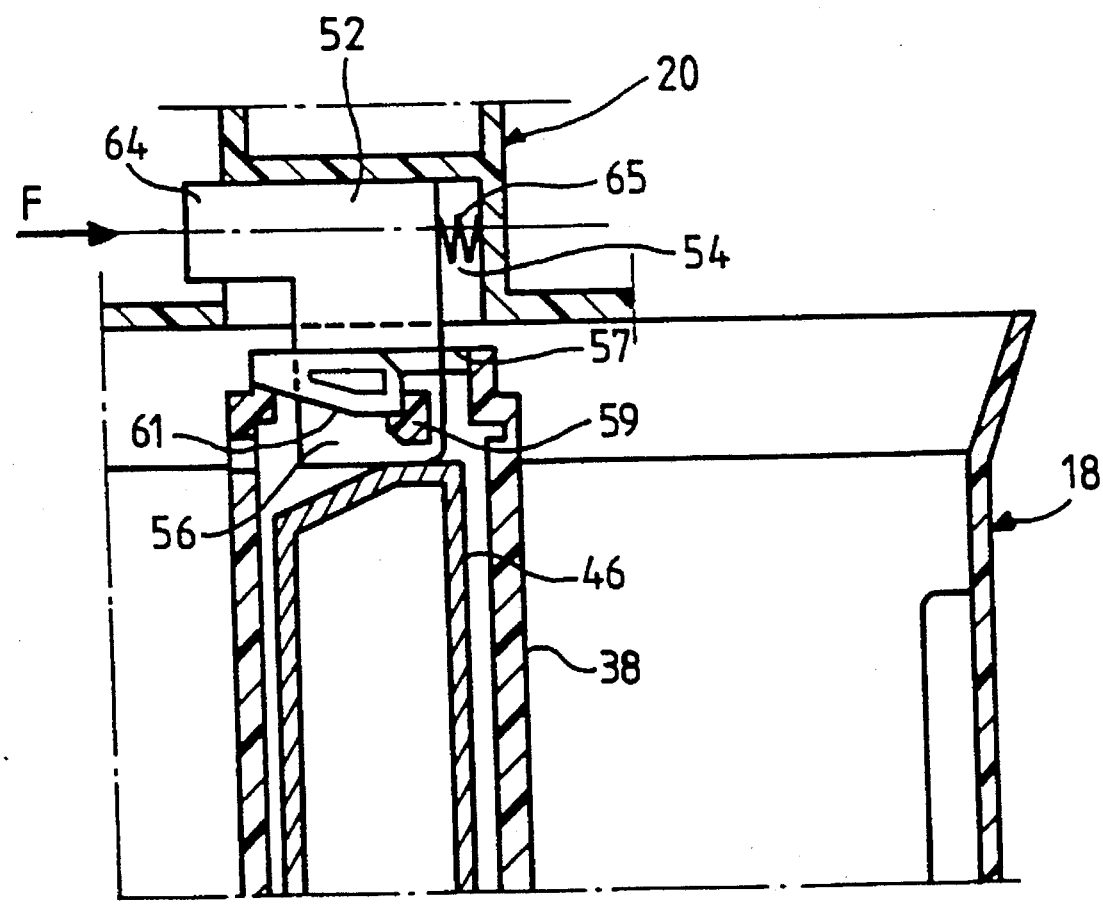
FIG_2

DOMESTIC MIXER WITH SAFETY DEVICE

FIELD OF THE INVENTION

The present invention relates to domestic mixers which comprise a base enclosing an electric motor whose output shaft projects vertically from the upper portion of the base, and an open bowl which is adapted to be closed by a cover, which is mounted removably on the base and whose bottom carries a rotatable tool secured to a vertical shaft passing through said bowl and adapted to couple with the output shaft of the motor.

BACKGROUND OF THE INVENTION

It is known that such domestic mixers are particularly effective to mix, beat and emulsion foodstuffs, as well as to crush ice.

In known mixers of this type, the bowl cover is generally removable and is maintained on the bowl, after emplacement by the user, by means of a securement system of bayonet type. A serious drawback of this type of apparatus resides in the possible starting of the apparatus by a child when the cover is off, the moving tool then being able to seriously hurt the child if he introduces his hand into the open bowl.

SUMMARY OF THE INVENTION

The invention has for its object to avoid this drawback and to provide a domestic mixer, of the type described above, which is provided with a safety device preventing starting the apparatus when the bowl cover is not closed.

According to the invention, the cover and the upper edge of the bowl are interrelated by at least one bolt which is secured to the cover and which is connected by means of a transmission member forming an integral part of the bowl and actuable by the bolt, to a control member movably mounted through the upper portion of the base between a working position to which it is brought when the cover is blocked by means of the bolt and in which, under the action of the transmission member controlled by the bolt, it actuates a safety switch in the electrical supply circuit of the motor so as to permit starting the motor, and a rest position to which it is brought when the cover is open and in which it does not actuate said safety switch and so stops the motor.

Thus, thanks to the presence of this bolt secured to the cover, it is thereafter impossible to start the motor of the apparatus when the cover of the bowl is not locked, thereby avoiding any risk of harm. Moreover, the fact that all the constituents of this safety device are an integral part of the apparatus permits in a desirable way maintaining the usual appearance of this type of apparatus.

BRIEF DESCRIPTION OF THE DRAWING

The characteristics and advantages of the invention will become further apparent from the description which follows of a particular embodiment given by way of non-limiting example, illustrated in the accompanying drawings, in which:

FIG. 1 is a schematic vertical cross-sectional view of a domestic mixer according to the invention, showing the cover of the bowl in locked position; and FIG. 2 is a fragmentary view on a larger scale and in cross section, of the bowl-cover assembly in the locked position.

DETAILED DESCRIPTION OF THE INVENTION

The domestic mixer 10 shown schematically in FIG. 1 comprises a base 11 enclosing an electric motor 13 whose output shaft 15 projects vertically from the upper portion 16 of the base, and a bowl 18, for example of 1.5 liter capacity, which is made for example of plastic material, which is adapted to be closed by a removable cover 20, which is mounted removably on the base 11 and whose bottom 22 carries a rotatable tool 24, such as a knife, secured to a vertical shaft 26 passing through the bottom wall 22 of the bowl and adapted to couple with the output shaft 15 of the motor 13 via a coupling device 28.

This coupling device 28, in a manner known per se, comprises a rubber drive 31 mounted at the end of the output shaft 15 of the motor and enclosed by a rigid cap 32 carried by the shaft 26.

The lateral wall of the bowl 18 is prolonged beyond the bottom wall 22 by a skirt 33 which is maintained in place on the base 11 by means of any suitable reversible securement system such as for example a bayonet system shown partially at 35 in FIG. 1, thereby ensuring the removable securement of the bowl 18 on the base 11.

As is shown in FIG. 1, the bowl 18 has a lateral closed hollow handle 38 adapted to facilitate its handling and extending over all its height. On its upper edge 40, the bowl 18 is provided with a pouring spout 41.

According to the invention, FIG. 1, the cover 20 and the upper edge 40 of the bowl 18 are interconnected by a bolt 44 which is secured to the cover 20 and which is connected, by means of a transmission member 46 forming an integral part of the bowl 18 and actuable by the bolt, to a control member 48 mounted movably through the upper portion 16 of the base 11 between two positions, namely:

a working position (FIG. 1) to which it is brought when the cover 20 is secured by the bolt 44 and in which, under the action of the transmission member 46 controlled by the bolt 44, it actuates a safety switch 50 arranged in the electrical supply circuit of the motor 13 so as to permit starting the motor;

a rest position (not shown) to which it is brought when the cover 20 is open and in which it does not actuate the safety switch 50, thereby to stop the motor 13.

In the embodiment shown in FIG. 1, the bolt 44 is comprised by a horizontal slide 52, for example of cylindrical form, disposed in a suitable recess forming a cage 54 provided in the cover 20 and provided with an actuating tongue 56 which is adapted to engage vertically in the handle 38 through an opening 57 provided in the upper edge 40 of the bowl 18 at the level of the connection of this latter with the handle 38 and which carries an angled automatic snap-in finger 59 adapted to coact with a bearing rib 61 formed on the outer surface of the side wall of the bowl 18 when the cover 20 is locked (FIGS. 1 and 2).

The slide 52 is movable between a resilient locking position in which the snap-in finger 59 is in engagement with the rib 61 (FIGS. 1 and 2) and an unlocked position in which the snap-in finger 59 is disengaged from the rib 61 and faces the opening 57 under the action of a manipulating member 64 (FIG. 2), such as for example a push-button, secured to the slide 52 and movably mounted against the action of an elastic means 65 (FIG. 2) such as for example a compression spring interposed between the bottom of the recess 54 of the cover 20 and the push-button 64.

In this embodiment, the transmission member 46 between the bolt 44 and the control member 48, FIG. 1, is a flat rod which is slidably mounted within the handle 38, whose upper end 46a coacts by bearing against the free end of the tongue 56 of the slide 52 in locked position, and whose lower end 46b extends from the lower portion of the handle 28 and coacts with the control member 48. In the present embodiment, this control member 48 of the safety switch 50 is in the form of a finger mounted vertically slidably through the upper portion 16 of the base 11 and urged by elastic means 67 (FIG. 1) such as for example a compression spring.

The cover 20 comprises moreover a plurality of resilient lugs 70, of which only one is shown in FIG. 1, distributed about the periphery of its external side surface and adapted to engage with a snap action during the closing of the cover 20 with corresponding external notches, of suitable profile, formed respectively on the upper edges of openings 72 provided in the bowl 18.

As shown in FIG. 1, the cover 20 in locked position has internally an annular sealing joint 73 provided with a peripheral lip 74 applied against an annular shoulder 76 formed on the internal surface of the side wall of the bowl 18, substantially at the level of the upper edge 40 of this latter.

There is shown at 79 in FIG. 1 a removable plug, of a structure known per se, engaged in a vertical chimney 81 provided in the cover 20 and adapted, after withdrawal of the plug, for the passage for example of alcohol during preparation of a cocktail.

It must be emphasized that the mixer according to the invention can be provided with two identical bolts 44 of the type described above, positioned relative to each other in the cover 20 in a diametrically opposed manner, the mixer bowl having then two laterally opposed hollow handles 38, so as to provide absolute safety.

With respect to FIGS. 1 and 2, the operation of the safety device incorporated in the mixer 10 according to the invention is as follows.

During emplacement of the cover 20 with a substantially vertical movement, the resilient lugs 70 engage with snap action on the corresponding notches of the bowl and, simultaneously, the tongue 56 of the bolt 44 engages elastically in the handle 38 through the opening 57 such that the finger 59 comes into engagement in a suitable manner with the rib 61 against the action of the spring 65. In the course of this engagement of the tongue 56 of the lug 44, the free end of the tongue 56 bears against the rod 46 which then is displaced downwardly and which, in its turn, effects downward displacement of the finger 48 against the return force of the spring 67 to bring it into its working position in which it actuates the safety switch 50 so as to permit starting the motor 13, see FIG. 1. The cover 20 being closed and blocked by the bolt 44, the mixer 10 is ready to operate.

For food preparation, the user pushes on the push-button 64 in the direction of the arrow F (FIG. 2), against the force of return spring 65, such that the slide 52 displaces along a path such that the finger 59 of the tongue 56 of the bolt 44 disengages from the rib 61 to come into alignment with the opening 57 of the handle 38. The slide 52 being thus unlocked, the user then raises, by pulling upwardly the cover 20 after disengaging the lugs 70 and simultaneously after disengaging by translation the tongue 56 of the bolt 44 through the opening 57 of the handle 38. After withdrawing the cover 20 thus unlocked, the rod 46 then moves upwardly under the action of the finger 48 which is urged upwardly by the spring 67 to its rest position in which it does not actuate the switch 50, thereby to stop the motor. The motor 13 being thus inactivated when the cover 20 is removed, the mixer 10 can thus not function, thereby ensuring complete safety.

We claim:

1. In a domestic mixer comprising a base (11) enclosing an electric motor (13) having an output shaft (15) that projects upwardly from an upper portion (16) of the base, and an open bowl (18) closed by a cover (20), said bowl being mounted removably on the base (11) and having a bottom (22) that bears a rotatable tool (24) secured to a vertical shaft (26) passing through said bowl and adapted to couple with the output shaft (15) of the motor; the improvement wherein the cover (20) and an upper edge (40) of the bowl (18) are releasably interconnected by a bolt (44) which is disposed in a recess (54) provided in the cover (20) and which is connected, by a transmission member (46) which is completely integrated in the bowl (18) and actuable by the bolt (44), to a control member (48) movably mounted through the upper portion (16) of the base (11) between a working position to which the control member is brought when the cover (20) is secured by the bolt (44) and in which, under the influence of the transmission member (46) controlled by the bolt (44), the control member actuates a safety switch (50) in an electric supply circuit of the motor (13) so as to permit operating the motor, and a rest position to which the control member is brought when the cover (20) is open and in which the control member does not actuate said safety switch (50), whereupon the motor (13) stops.

2. Domestic mixer according to claim 1, wherein the bolt (44) is comprised by a slide (52) having a tongue (56) adapted to pass through an opening (57) provided in the upper edge (40) of the bowl (18), the slide being mounted elastically in a locking position and being adapted, by sliding, to occupy an unlocked position, the slide (52) being secured to and slidable by an actuating member (64) and said tongue (56) of the slide carrying an automatic snap-in finger (59) adapted to coact, in the locked position, with a retaining abutment member (61) secured to the bowl (18).

3. Domestic mixer according to claim 2, wherein the actuating member (64) is a push-button acting against a return spring (65) which is interposed between the bottom of said recess (54) and the push-button (64) and which is adapted releasably to maintain the slide (52) in its locked position, said slide (52) being displaced towards its unlocked position under the influence of the push-button against the force of the return spring (65).

4. Domestic mixer according to claim 2, wherein the bowl (18) has a lateral closed and hollow handle (38) connected at the upper edge of the bowl and extending over all the height of the bowl, the tongue (56) of the slide (52) being adapted to engage in the handle (38) at the level of the connection of the handle with the upper edge of the bowl, and the transmission member comprising a rod (46) mounted slidingly within the handle (38) of the bowl, while the control member is constituted by a finger (48) mounted sliding vertically through the upper portion (16) of the base (11) and being urged upward by a return spring (67), said rod (46) being adapted to be downwardly displaced by the pressure of the tongue (56) of the slide (52) in locked position on an upper end (46*a*) of the rod, thus giving rise to downward displacement of said finger (48), against the return force of the spring (67), to bring said finger (48) into its working position, and upwardly displaced upon removal of the cover (20) for which the slide (52) is in the unlocked position, said finger (48) being then urged upwardly by the spring (67) into its rest position.

5. Domestic mixer according to claim 1, wherein the cover has an outside lateral surface which comprises about its periphery a plurality of resilient lugs (70) that engage snap fittingly, during closure of the cover (20), with corresponding notches (72) provided in the bowl (18).

6. Domestic mixer according to claim 1, wherein the cover (20) carries internally an annular sealing joint (73) provided with a peripheral lip (74) that comes to bear, upon closure of the cover (20), against an annular shoulder (76) formed on an internal surface of the bowl (18).

\* \* \* \* \*